July 7, 1959    W. A. JANECZKO    2,893,329
REMOVABLE SECTIONAL COVER FOR FREIGHT CAR
Filed Feb. 18, 1954    4 Sheets-Sheet 1
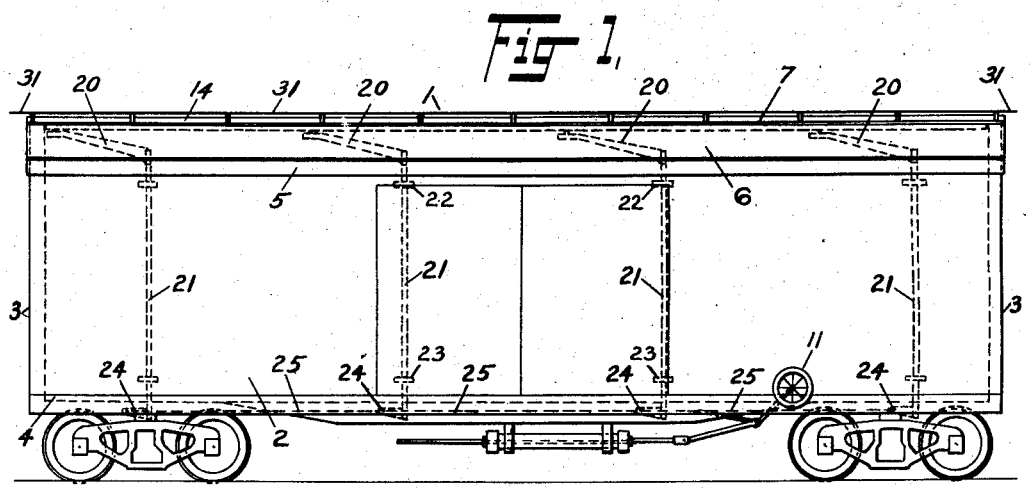
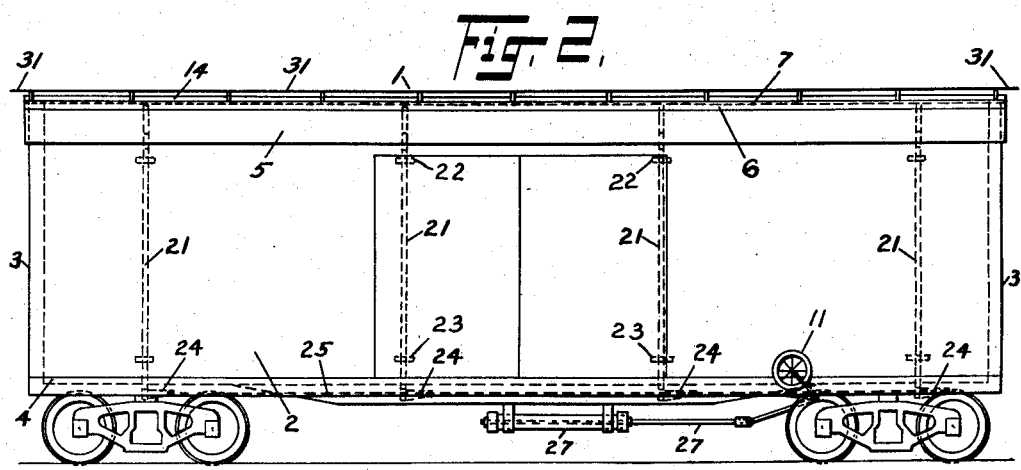
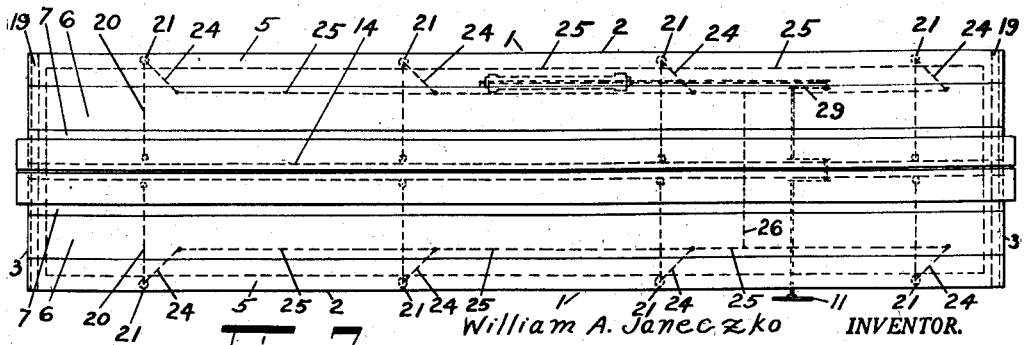
William A. Janeczko INVENTOR.
BY *N.S. Armstutz*
ATTORNEY July 7, 1959 W. A. JANECZKO 2,893,329
REMOVABLE SECTIONAL COVER FOR FREIGHT CAR
Filed Feb. 18, 1954 4 Sheets-Sheet 2
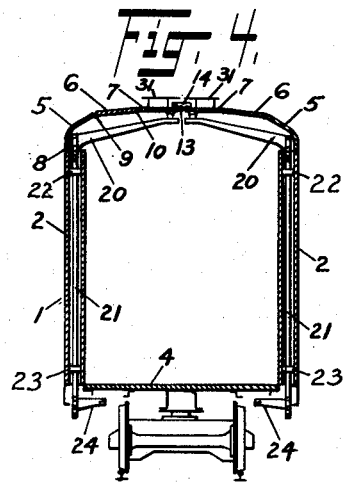
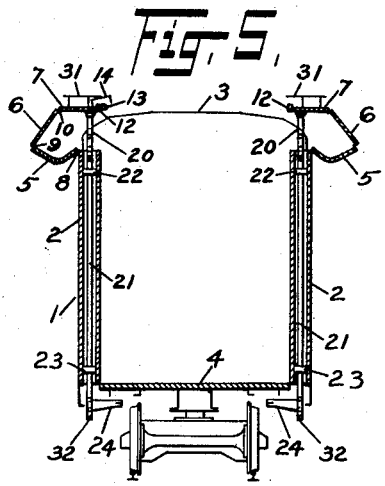
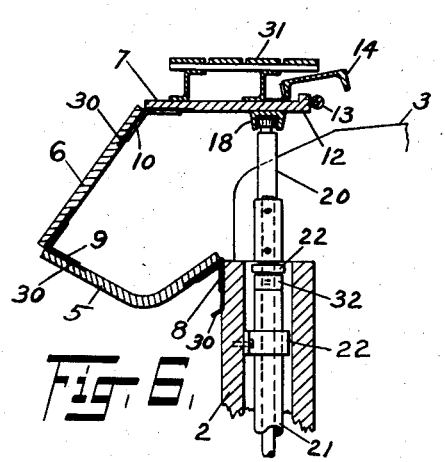
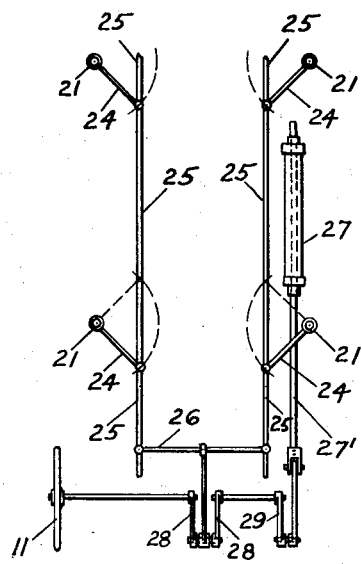
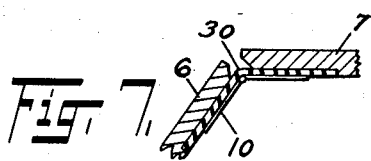
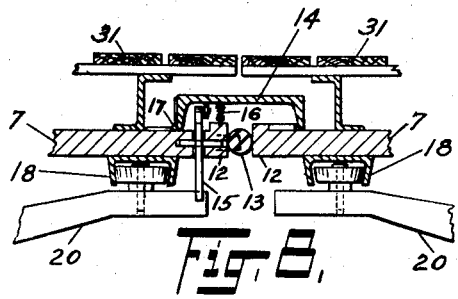
William A. Janeczko INVENTOR.
BY H.S. Amstutz
ATTORNEY July 7, 1959 W. A. JANECZKO 2,893,329
REMOVABLE SECTIONAL COVER FOR FREIGHT CAR
Filed Feb. 18, 1954 4 Sheets-Sheet 3
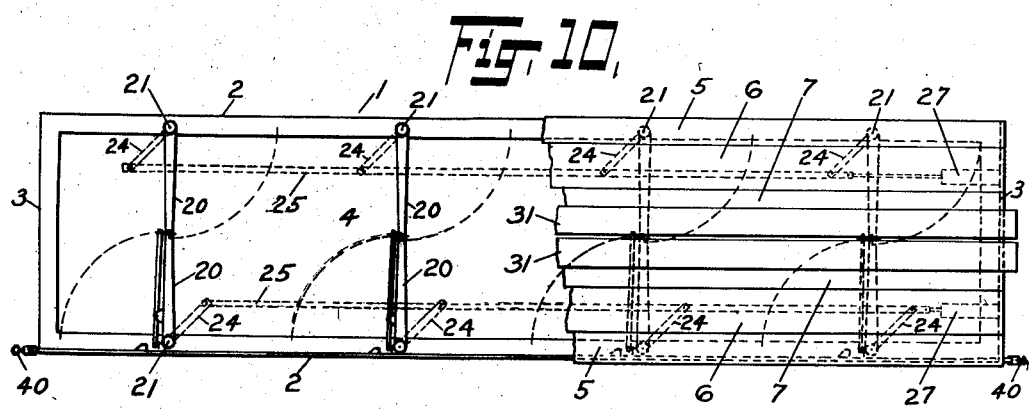
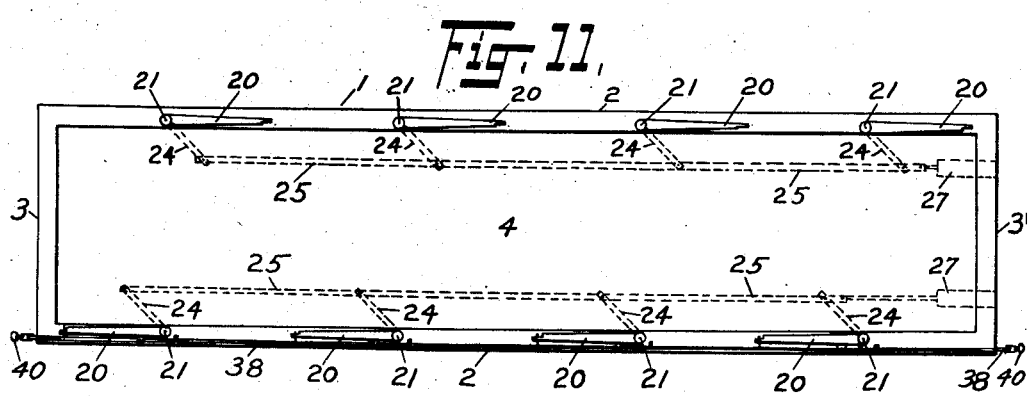
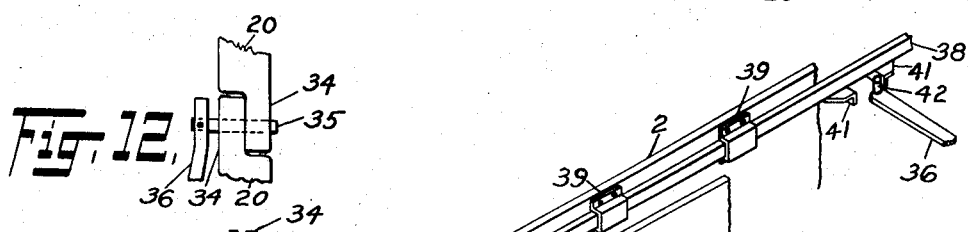
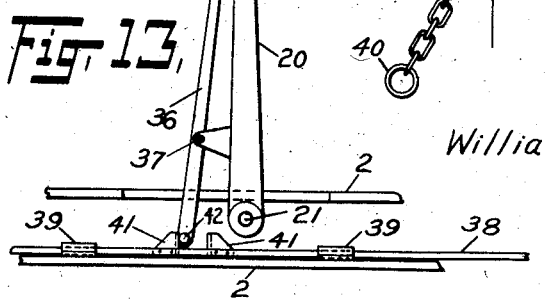
William A. Janeczko INVENTOR.
ATTORNEY July 7, 1959 W. A. JANECZKO 2,893,329
REMOVABLE SECTIONAL COVER FOR FREIGHT CAR
Filed Feb. 18, 1954 4 Sheets-Sheet 4
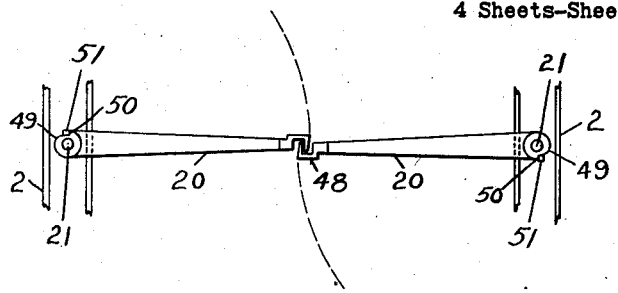
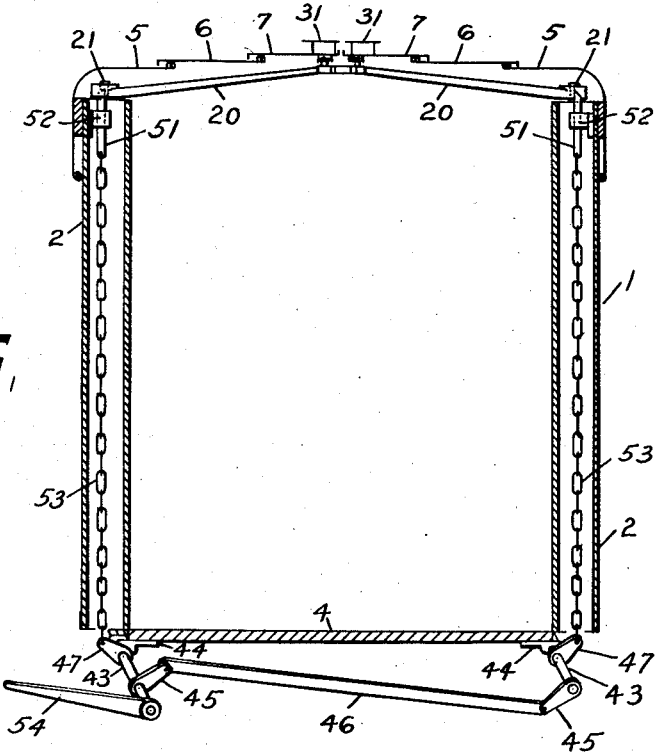
William A. Janeczko INVENTOR.
BY
ATTORNEY.

United States Patent Office 2,893,329
Patented July 7, 1959

2,893,329

REMOVABLE SECTIONAL COVER FOR FREIGHT CAR

William A. Janeczko, Hammond, Ind.

Application February 18, 1954, Serial No. 411,047

4 Claims. (Cl. 105—377)

The invention relates generally to improvements in box or freight cars and more particularly is directed to means to facilitate the loading and unloading thereof.

One of the important objects of the invention is to provide a box car having side walls and roof sections which are operatively connected to the side walls in a manner whereby the sections may be moved outwardly to open the top of the car so that freight may be introduced into the car through the top.

A particular object of the invention is to provide a box car of the kind described above in which each of the roof sections is comprised of three hinged panels and provision is made for detachably connecting the sections in a closed and sealed relationship.

A significant object of the invention is to provide unique crank means for actuating the roof sections to open or closed positions with means for operating the actuating means.

Other objects and advantages of the invention will become apparent after the description hereinafter set forth is considered in conjunction with the drawings annexed hereto.

In the drawings:

Figure 1 is a side view of a box or freight car with the roof open;

Figure 2 is a side elevation of Figure 1 with the roof closed;

Figure 3 is a top plan view of Figure 2;

Figure 4 is a vertical section taken through Figure 2 showing the roof closed;

Figure 5 is a vertical section taken through Figure 1 showing the roof sections located in positions to open the top of the car;

Figure 6 is a partial vertical section showing the operative relationship between the panels of a roof section;

Figure 7 illustrates one of several water proof hinged joints between the panels of each roof section;

Figure 8 is an enlarged section illustrating the way the roof sections are connected;

Figure 9 is a top plan view of the means utilized to open and close the roof sections;

Figure 10 is a top plan view of a car with portions removed to depict different means for actuating the roof sections and means for connecting the crank arms;

Figure 11 is a view similar to Figure 10 showing the cranks and actuating means in positions to support the roof sections outwardly to open the car;

Figure 12 is an enlarged partial view showing details of arm locking means employed in conjunction with structure exemplified in Figures 10 and 11;

Figure 13 is a partial view illustrating additional details of the locking means shown in Figure 12;

Figure 14 shows a manual control for the mechanism shown in Figures 12 and 13;

Figure 15 is a top plan view of modified interlocking connection between supporting means; and Figure 16 is a vertical section taken through a car showing the means for locking the crank structure illustrated in Figure 15.

The invention may be embodied in any standard freight car. The car 1, among other things, includes side walls 2, end walls 3, floor 4, and two roof sections, each of which comprises hinged panels 5, 6 and 7. The roof sections extend longitudinally the full length of the car with one section covering one-half of the car and the other section the other half so that the panels of the respective sections are disposed on opposite sides of the medial line of the car. Each of the panels 5 may be referred to as an outer or first one and is hinged or pivoted at 8 to the upper edge of a side wall 2. Each of the panels 6 may be referred to as an intermediate or second one and each is hinged at 9 to an outer panel 5; and each of the panels 7 may be referred to as an inner, center or third one and each is hinged at 10 to an intermediate panel 6. Sheets of rubber 30 or the equivalent are secured over the hinges to prevent water and other foreign matter from entering the car through the joints between the panels.

The actuating mechanisms for opening and closing the roof sections are individually supported on the side walls 2 of the car 1 and preferably include four equally spaced apart vertical shafts 21 disposed in each of the side walls. Long cranks 20 are attached to the upper ends of the shafts for movement therewith. The shafts 21 may be rotated to swing the cranks to positions in the plane of the side walls as shown in Figures 1 and 5 to pull and locate the roof sections to open the top of the car or to swing the cranks inwardly in transverse positions as shown in Figure 4 to support and connect the sections together to close the top of the car. The underside of each of the inner or center panels 7 is provided with four straight track means 18 and the outer ends of the cranks are provided with rollers which are held for movement in the track means as illustrated in Figures 6 and 8 to impart movement to the roof sections when the cranks are rotated by the shafts 21. More particularly in this regard, the panels 5, 6 and 7 on one side of the car will take the positions shown in Figure 6 when the shafts on this side of the car are rotated to cause the rollers to ride in the tracks 18. The panels on the other side of the car can be similarly positioned by operating the shafts and cranks mounted thereon. When the roof sections are fully open the outer panels 5 take positions substantially at right angles to the sides of the car and the inner panels 7 are substantially horizontal with the intermediate panels 6 in inclined positions. In fact, the inner or third panels are maintained horizontal when the cranks are actuated.

The inner edges of the inner panels 7 are preferably flanged at 12 and a gasket 13 is carried by one of the flanges for engaging the other flange to seal the roof sections at their longitudinal junction. Seals 19 are also provided to seal the ends of the roof sections against the end walls 3 of the car. A longitudinally extending inverted channel 14 is hinged at 17 to the upper side of one of the inner panels as shown in Figures 6 and 8 and serves to cover and protect the junction between the roof sections. A spring 16 acts to normally maintain the trough in a covering position and a lever 15 is pivoted on the inner panel carrying the channel 14. The upper end of this lever carries a roller and its lower end is disposed for engagement by one of the cranks 20 to actuate the lever to cam and lift the channel as the roof sections are moved apart by the cranks swinging on the vertical shafts 21. The lever 15 is actuated by a crank whenever the roof sections 7 are initially moved apart or as they closely approach one another. A pair of corresponding conventional running board parts 31 are respectively mounted on the inner panels 7 of the roof sections.

The means including the vertical shafts 21 employed for operating the cranks will now be described. The shafts 21 are journalled in upper bearings 22 and lower bearings 23 for supporting the shafts substantially within the confines of the side walls 2 of the car body. A collar 32 on each shaft limits its vertical movement. The lower end of each shaft below each side of the car, as shown in Figure 9, is provided with a lever 24 which, in turn, is connected to a longitudinally extending rod 25. The rods 25 are joined by a cross bar 26 and a crank mechanism, including cranks 28, are operatively connected to the bar 26 to operate the rods 25 to impart simultaneous rotary movement to the vertical shafts 21 and swinging of the cranks 20 when a hand wheel 11, located adjacent the side of the car, is manipulated. If desired, this crank mechanism can be operatively connected with a power unit 27 by means of a connecting rod 27' and suitable linkage 29, as shown in Figure 9.

As illustrated in Figures 10 through 14, means may be employed for interlocking the ends of the cranks 20. As shown in Figure 12 the inner end 34 of each crank is notched to interengage or overlap. Each of the ends is provided with a hole for receiving a locking element 35 carried by the inner end of a rocker arm 36 associated with each of the cranks adjacent one side of the car. A rocker arm is pivoted at 37 to each of these particular cranks and the outer end of each arm is provided with a cylindrical upstanding abutment in the form of a pin 42 which is disposed between a pair of corresponding spaced abutments 41 carried by a bar 38 mounted for reciprocation in brackets 39 within the confines of one of the side walls 2 of the car body as clearly illustrated in Figures 13 and 14. The ends of the bar 38 may be extended through the end walls 3 of the car so that chains 40 can be connected thereto for manipulating the rod in either direction. The arrangement is preferably such that the arms 36 will automatically withdraw the pins 35 from the aligned holes in the ends of the cranks when the row of cranks carrying the arms are swung counter-clockwise as viewed in Figure 10 due to the fact that the rocker arms are carried by the cranks. The chains 40 are employed to manipulate the bar 38 to actuate the rocker arms 36 to effect a locking of the cranks after they are swung inwardly to support the roof sections. In other words, when the inner ends 34 of the cranks are interconnected, the locking pins 35 can be inserted into the aligned holes in the ends 34. Also, if desired, the bar can be actuated to release the locking pins when the cranks are in roof supporting positions.

As shown in Figures 10 and 11 the cranks carrying the arms 36 and located on one side of the car body may be actuated by a rod 25 and the cranks on the other side of the car and not carrying rocker arms may be actuated by another rod 25. These rods may be jointly or separately operated by power units 27. It will be noted that each of the cranks carrying an arm 36 is swingable through an arc of substantially ninety degrees from a transverse roof supporting position toward one end of the car and that each of the cranks not carrying arms is similarly swingable in an arc from a transverse roof supporting position in a direction toward the opposite end of the car so that the cranks on one side can be brought into engagement with the cranks on the other side of the car without interfering with one another. It will also be noted that the movement of the cranks exemplified in Figures 10 and 11 is different from the corresponding movements of the cranks in Figures 1 through 9.

In the modification illustrated in Figures 15 and 16, there are shown arms which are swingable in the same manner as the arms in the modification disclosed in Figures 10 through 13, but which are different to the extent that their inner ends are provided with hooks 48 which are adapted to interfit with one another. Also, different means are employed to lock the arms in roof supporting positions. More particularly in this respect, the cranks are provided with hubs 49 which are connected to the upper ends of vertical shafts and each hub is provided with an abutment 50 which is adapted to be engaged by a vertically movable locking pin 51 mounted in a suitable bearing 52. A spring, not shown, is preferably associated with each of the pins 51 so as to normally urge the pin upwardly to a predetermined locking position.

Any means suitable for the purpose may be utilized to actuate the pins 51 but as herein shown, a flexible member, such as a chain 53, is connected to each pin. The chains are disposed in the side walls of the car and their lower ends are connected to levers 47 on rods 43 which are located under the car and extend longitudinally thereof. The rods are journalled in bearings 44, and are connected together by a cross bar 46. The rods are provided with levers 45 to which the ends of the bar 46 are attached. One of the rods is preferably provided with a hand lever 54 which when moved downwardly will simultaneously pull the locking pins downwardly to release all of the cranks from their previously locked positions by the pins engaging the abutments 50.

In view of the foregoing, it wil be manifest that improved means have been provided for easily and quickly opening and closing roof sections of a freight or box car to facilitate the loading and unloading thereof in addition to that provided by conventional side doors.

Having thus described my invention, it is obvious that various modifications may be made in the same without departing from the spirit of the invention, and, therefore, I do not wish to be understood as limiting myself to the exact forms, constructions, arrangements and combinations of parts herein shown and described.

What I claim is:

1. In combination: a box car having a bottom, side walls, end walls and an open top, a longitudinally extending first roof section having one longitudinal edge hinged to the upper edge of one of the side walls, a second longitudinally extending section having one longitudinal edge hinged to the other edge of the first section, a third longitudinally extending section having one longitudinal edge hinged to the other edge of the second section and provided with a straight guiding track, a vertical shaft rotatably mounted on said one side wall and provided with an angularly disposed arm adjacent its upper extremity, said arm having an outer end slidably connected to the track, and means for rotating the shaft in one direction to cause the arm end to move with respect to the track and impart simultaneous relative movements to the sections to cover a part of the open top of the car or in a reverse direction to move the sections laterally to uncover a part of the open top.

2. The structure defined in claim 1, in which the third section is supported by the arm and a plurality of additional shaft supported arms for moving this section in a substantially horizontal plane when the shafts are rotated.

3. In combination: a box car having a bottom, side walls, end walls and an open top, a pair of longitudinally extending first roof sections having longitudinal edges respectively hinged to the upper edges of the side walls, a second pair of longitudinally extending sectons having longitudnal edges respectively hinged to the other edges of the first sections, a third pair of longitudinally extending sections having longitudinal edges hinged to the other edges of the second sections and respectively provided with straight guiding tracks, a pair of vertical shafts respectively rotatably mounted on the side walls and respectively provided with angularly disposed arms adjacent their upper extremities, said arms having outer ends slidably connected to the tracks, and means whereby shafts may be rotated to cause the arm ends to move with respect to the tracks and impart simultaneous relative movements to the sections to cover the open top of the car or move the sections laterally to uncover the open top.

4. In combination: a box car having a bottom, side walls, end walls and an open top, a pair of longitudinally extending first roof sections having longitudinal edges hinged to the upper edges of the side walls, a second pair of longitudinally extending sections having longitudinal edges hinbed to the other edges of the first sections, a third pair of longitudinally extending sections haveing longitudinal edges hinged to the other edges of the second sections and respectively provided with straight guiding tracks, a pair of vertical shafts respectively rotatably mounted on the side walls and respectively provided with angularly disposed arms adjacent their upper extremities, said arms having outer ends slidably connected to the tracks, means for rotating the shafts to cause the arm ends to move with respect to the tracks and impart simulltaneous relative movements to the sections to cover a part or all of the open top of the car or move the sections laterally to uncover a part or all of the open top, an elongated channel cover having one side thereof pivotally connected to one of the third pair of sections for covering the other edges of these sections when they are brought together, and means actuated by one of the arms for pivoting the cover upwardly when the third sections are moved apart.

References Cited in the file of this patent

UNITED STATES PATENTS

| | | |
|---|---|---|
| 296,809 | Wyman | Apr. 15, 1884 |
| 711,163 | Hoover | Oct. 14, 1902 |
| 834,287 | Frey | Oct. 30, 1906 |
| 1,022,661 | Duner | Apr. 9, 1912 |
| 1,172,562 | Rowntree | Feb. 22, 1916 |
| 1,934,929 | Jonsson | Nov. 14, 1933 |
| 2,366,967 | Kassler | Jan. 9, 1945 |
| 2,578,909 | Turner | Dec. 18, 1951 |
| 2,629,339 | Kovachick | Feb. 24, 1953 |
| 2,770,297 | Mercier | Nov. 13, 1956 |